Patented Jan. 16, 1951

2,538,034

UNITED STATES PATENT OFFICE 2,538,034

PREPARATION OF FATTY ALCOHOLS

William Jennings Peppel, Lodi, N. J., assignor to Burton T. Bush, Inc., New York, N. Y., a corporation of New Jersey No Drawing. Application February 15, 1947, Serial No. 728,955

4 Claims. (Cl. 260—638)

This invention relates to a process for preparing aliphatic alcohols containing eleven to eighteen carbon atoms, and to novel compositions of matter suitable for use in the process.

It is known that aliphatic alcohols containing from eleven to eighteen carbon atoms possess properties which make them peculiarly suitable for certain applications. Thus, either as such, i. e., as alcohols, or when used as chemical intermediates, they have found an already extensive use in several industries, among which may be mentioned the food, pharmaceutical, cosmetic and detergent fields. There can be no question but that the commercial importance of this group of alcohols, though substantial at the present time, will continue to increase for some time.

As would be supposed in view of the commercial significance of these alcohols, considerable efforts have been made to develop satisfactory processes for their production. Indeed, several distinct chemical processes have already been developed. However, these known methods are subject to several important disadvantages. Some of the methods are merely laboratory methods, that is to say, because of their nature these methods cannot be applied on a commercial scale, because, e. g., of the high costs entailed. Other prior art methods, though of commercial nature, fall short because of poor yields, the formation of by-products and the need for careful chemical purification technique.

By the invention of Eric C. Kunz and Alphonse T. Fiore which is the subject of the co-pending application, Serial No. 601,066, filed June 22, 1945, a commercially feasible and technically simple process was developed for making substantially pure aliphatic alcohols having eleven to eighteen carbon atoms. Their process is especially characterized by the following desirable features: high yields of the alcohols, unusually small amount of by-products formed, and the fact that the alcohols are formed in such purity that there is no need to resort to chemical purification techniques in order to obtain the alcohols in substantially pure form.

The Kunz-Fiore invention involves reacting aliphatic acids containing eleven to eighteen carbon atoms with hydrogen in the presence of the copper salts of the corresponding acids, at elevated temperatures and under super-atmospheric pressures.

My present invention involves an improvement in the aforesaid Kunz-Fiore process. Whereas, in accordance with their process it is necessary to prepare the copper salt of carboxylic acid separately and then bring the salt into contact with the acid to be hydrogenated, my process has as one advantageous feature the point that the copper salt is formed in situ, in the presence of the acid to be hydrogenated. As a result, my process is more convenient to operate. Moreover, where copper carbonate has been used in the formation of the copper salt it has been found that non-reproducible results were obtained. I have found that by suitable treatment reproducible results can be obtained in such cases, and this feature of my invention forms another aspect thereof.

In general, my process may be carried out by first forming a solution of the carboxylic acid to be hydrogenated and copper carbonate at a temperature at which the acid is liquid, removing residual solids and adding to the liquid a solution of alkali metal hydroxide in some more of the acid to be hydrogenated. This resulting composition may be placed in a suitable pressure vessel, and sufficient hydrogen to attain a pre-determined pressure is added. Heat is applied while the vessel or its contents alone is agitated until the desired temperature is reached. After a pre-determined amount of hydrogen has been used up in the reaction heat is discontinued, agitation is stopped, the contents are cooled, and the gases are permitted to escape. The solids are removed by filtration while the organic reaction products are in a molten condition. Substantially pure alcohols are obtained from the latter by suitable treatment such as for example, by vacuum distillation.

The fatty acids employed herein may be saturated fatty acids; or, if desired, they may contain carbon-to-carbon double bonds. The invention is not limited to the use of one acid as the starting acid, but, if desired, a mixture of two or more acids may be employed.

As regards the copper-containing material employed in my process, I prefer to use basic copper carbonate, which has the formula,

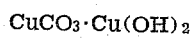

$$CuCO_3 \cdot Cu(OH)_2$$

and consists of dark green, monoclinic crystals. In place of this material the copper carbonate having the formula, $2CuCO_3 \cdot Cu(OH)_2$, also may be employed. This material is a blue, monoclinic crystalline solid.

I have found that satisfactory results are obtained when enough copper carbonate is employed to yield amounts of copper salts as low as 5%, by weight, of the free acid to be hydrogenated. Amounts up to 50%, on the same basis, also may be employed to advantage. However, it is preferred to use enough copper carbonate to yield amounts of copper salts equal to about 10% to about 30% on the above indicated basis.

As before noted, the copper carbonate is dissolved in an excess of carboxylic acid while the latter is in a molten condition. For this step, temperatures between about 80° C. to about 150° C. may be employed. I recommend removal of any undissolved solids as otherwise these insoluble materials may affect the copper-containing compound in such a way that the reaction follows an undesired course.

In addition to the foregoing, I also have found that it is desirable to add to the solution formed by adding copper carbonate to carboxylic acid, after removal of the undissolved materials aforesaid, a small amount of alkali metal hydroxide. The purpose of this addition is to yield a filtrable, copper-containing solid following the reduction step, in place of a colloidal, difficultly-soluble sol, which otherwise appears.

If desired, the alkali metal hydroxide may be dissolved in some free carboxylic acid prior to addition to the reaction mixture. Sodium potassium or lithium hydroxide may be employed. The amount of alkali metal hydroxide which may be employed may vary over wide limits. I have found that amounts between about 0.05% and about 0.15%, based on weight of the total composition to be hydrogenated, give the desired result. However, amounts outside these limits may also be employed, if desired.

The reduction reaction may be conducted for varying times, depending on the acid, pressure, and temperature employed. Satisfactory results have been obtained with a reaction period of 20 minutes, whereas some reactions require as much as 24 hours for maximum yields. In general, 2 to 12 hours is the usual reaction period.

Pressures from about 2000 to about 3500 pounds per square inch may be employed, though preferably pressures between about 2500 and about 3000 pounds per square inch are used. Temperatures between about 260° C. and about 310° C. have been tried and give satisfactory results, though it is preferred to operate between about 280° C. and 290° C.

In order more fully to clarify this invention, the following examples are given by way of illustration.

EXAMPLE I

*Preparation of cetyl alcohol*

236 grams of palmitic acid (Armour, M. P. 56° C.) and 10 grams of basic copper carbonate were mixed and the charge was melted on the steam bath, with constant stirring. After about an hour, the evolution of carbon dioxide ceased. The charge was then filtered hot, with suction, through a kieselguhr mat. Potassium hydroxide (0.3 gram) was dissolved in 20 grams of palmitic acid and the solution was added to the filtrate from the previous step.

The resulting material was placed in a stainless steel insert of 700 cc. capacity. The insert, after cooling, was then set into a standard rocking type autoclave of 3000 cc. capacity, manufactured by the American Instrument Company. Two specially prepared fittings were used to anchor the insert within the rocking autoclave.

The air was removed from the system with high vacuum and hydrogen gas was introduced to 1700 pounds per square inch pressure. The unit was then electrically heated without rheostat control and within a few minutes the temperature rose to about 85° C. to 100° C., and rocking was begun. Within about an hour and a half, an operating temperature of 280° C. to 285° C. and pressure of 2500 to 2800 pounds were attained. This range of temperature was maintained with rheostat control. The pressure began to drop, indicating that hydrogen was reacting. After 3 hours at 280° C. to 285° C., the pressure had dropped to a practically constant level. The system was cooled, the pressure was released and the contents of the insert were removed at 70° C. to 80° C., to insure a molten condition.

The reaction product contained water and finely divided solids which suspended readily and gave the mass a black appearance. However, by filtering the product, maintained at about 90° C., through a filter aid such as kieselguhr, a clear water white product was obtained. This product had an acid number of 0.6 and a saponification number of 12. On distillation, a fraction consisting substantially of cetyl alcohol, along with a small amount of myristyl and stearyl alcohols, was obtained. This fraction boiled over the range of 160° C. to 172° C./at 2–3 mm. pressure, and weighted 220 grams. The source of the myristyl and stearyl alcohols is in the starting fatty acid which is not chemically pure and represents the quality of commercial acid available by specialized fractionation of natural fatty acid mixtures. The starting acid contained myristic and stearic acids, which are reduced to the corresponding alcohols in the process.

EXAMPLE II

*Preparation of lauryl alcohol*

A mixture of 220 grams of technical lauric acid, containing approximately 90% lauric acid and about 10% myristic acid, and 10 grams of basic copper carbonate was stirred and heated on the steam bath until substantially all of the carbonate had reacted and the evolution of carbon dioxide had become negligible. The molten mixture was then separated from a small quantity of residual suspended solid by filtration through a bed of kieselguhr with the aid of suction. One half gram of U. S. P. potassium hydroxide was then allowed to react with 30 grams of lauric acid at steam bath temperature until practically completely dissolved and the solution was then filtered. The filtrate was then added to the previously prepared solution while still molten.

The combined solutions were charged to the autoclave described in Example I and the hydrogenation carried out essentially in the same manner. The reactor was charged with hydrogen to an initial pressure of 1700 pounds per square inch and heated over a period of about 1 hour to a temperature of 275° C. to 285° C. and held within this temperature range for approximately 2 hours. At the end of this interval, no further drop in gauge pressure was noted and the absorption of hydrogen was assumed to be at an end. Agitation was then stopped and the reactor allowed to cool to room temperature.

After venting the excess hydrogen, the contents of the reactor were removed and filtered to separate the catalyst, which was found in a black, easily filtrable form. The colorless filtrate on distillation gave a fraction boiling over the range 114° C. to 120° C./2 mm. and weighing 207 grams. The fraction had an estimated molecular weight of 185 and was found to be free of starting acid.

EXAMPLE III

*Preparation of myristyl alcohol*

Technical myristic acid (232 grams) having an average molecular weight of 245 was employed in preparing a hydrogenation mixture as described in Example II and the hydrogenation was carried out in an analogous manner. The crude mixture of alcohols was distilled and a fraction boiling over the range 138° C. to 165° C./2 mm. collected. The yield of distilled alcohol was 86.4% of the weight of the crude hydrogenation product, which was equal to 210 grams. The technical mixture of alcohols, consisting principally of myristyl alcohol, had an average molecular weight of 223.

The foregoing illustrates the practice of this invention, which however, is not to be limited thereby but is to be construed as broadly as permissible in view of the prior art and limited solely by the appended claims.

I claim:

1. In the process for preparing saturated aliphatic alcohols containing eleven to eighteen carbon atoms by reacting with hydrogen gas under elevated temperature and pressure a material obtained by dissolving a minor amount of copper carbonate in an aliphatic carboxylic acid having eleven to eighteen carbon atoms at a temperature at which said acid is liquid, the improvement which comprises removing undissolved solids from said material and adding a small amount of an alkali metal hydroxide to the hydrogenation charge, conducting the hydrogenation and filtering the resulting easily-filtrable, copper-containing solid contained in the hydrogenated charge.

2. The process of claim 1, wherein the acid employed is lauric acid.

3. The process of claim 1, wherein the acid employed is palmitic acid.

4. The process of claim 1, wherein the hydrogenation conditions are a temperature within the range of about 280° C. to 290° C. and a pressure within the range of about 2500 to 3000 pounds per square inch and the material which is hydrogenated is obtained by dissolving about 2 to 4 parts by weight of basic copper carbonate in 100 parts by weight of palmitic acid at a temperature between about 80° C. and about 150° C., filtering residual solid material from the solution, and adding to the solution another solution prepared by dissolving about 0.05 part by weight of potassium hydroxide in 1 to 2 parts by weight of palmitic acid.

WILLIAM JENNINGS PEPPEL.

REFERENCES CITED

The following references are of record in the file of this patent:

UNITED STATES PATENTS

| Number | Name | Date |
|---|---|---|
| 2,023,383 | Schrauth et al. | Dec. 3, 1935 |
| 2,121,367 | Schiller | June 21, 1938 |
| 2,322,095 | Schmidt | June 15, 1943 |
| 2,322,097 | Schmidt | June 15, 1943 |
| 2,340,690 | Richardson et al. | Feb. 1, 1944 |